(12) United States Patent
Imai et al.

(10) Patent No.: US 6,485,183 B1
(45) Date of Patent: Nov. 26, 2002

(54) PLAIN BEARING FOR CONNECTING RODS

(75) Inventors: Satoshi Imai, Nagoya (JP); Akira Ono, Nagoya (JP); Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 56 days.

(21) Appl. No.: 09/713,015

(22) Filed: Nov. 16, 2000

(30) Foreign Application Priority Data

Dec. 7, 1999 (JP) .......................................... 11-347514

(51) Int. Cl.⁷ ................................................. F16C 9/04
(52) U.S. Cl. ........................................ 384/430; 384/294
(58) Field of Search .............................. 384/275, 288, 384/294, 295, 296, 429, 430, 432, 433

(56) References Cited

U.S. PATENT DOCUMENTS 4,239,303 A * 12/1980 Backlin ...................... 384/429
4,845,817 A * 7/1989 Wilgus ....................... 384/294
5,192,136 A * 3/1993 Thompson et al. ......... 384/294

FOREIGN PATENT DOCUMENTS

| GB | 1 168 914 | 10/1969 |
| GB | 1 536 780 | 12/1978 |
| GB | 1 589 322 | 5/1981 |
| GB | 2 207 961 A | 2/1989 |
| JP | 56-147915 A | 11/1981 |
| JP | 5-302617 A | 11/1993 |

* cited by examiner

*Primary Examiner*—Thomas R. Hannon
(74) *Attorney, Agent, or Firm*—Browdy and Neimark

(57) ABSTRACT

A plain bearing which is mounted in an end of a connecting rod consists of a pair of hemi-circular bearing halves of which axial ends are provided with flanges being integrally fixed by welding. The flanges improve the rigidity of the bearing halves. The big end of the connecting rod can have improved rigidity by mounting the bearing halves therein.

3 Claims, 5 Drawing Sheets

PLAIN BEARING FOR CONNECTING RODS

BACKGROUND OF THE INVENTION

The present invention relates to a plain bearing for connecting rods, which is mounted on an end of a connecting rod, more particularly the plain bearing which can enhance rigidity of the connecting rods.

For example, in engines of motor vehicles, a wrapped bush type plain bearing with a small diameter is mounted on the small end of a connecting rod to receive a piston pin, and a hemi-circular plain bearing with a large diameter is mounted on the big end of the connecting rod to receive a crank pin.

Such a connecting rod has been usually made of steel and has high rigidity. On the other hand, recently, in engines of race cars and high-speed/high-power engines of a part of usual cars, connecting rods have been made of a light metal alloy, such as titanium or aluminum, in order to make the engines lighter. However, because the connecting rod made of a light metal alloy has lower rigidity than steel one, it is comparatively flexible, especially at the big end thereof which receives a large diameter plain bearing, whereby the plain bearing, which receives a crank pin, may be damaged.

Specifically, because the connecting rod transforms the reciprocating movement of a piston into the rotational movement of a crankshaft, compression and tensile loads are alternately exerted on the big end of the connecting rod. Thus, the big end 1 is deformed by the alternate dynamic load so as to be elongated and compressed in the longitudinal direction of the connecting rod as shown in FIG. 6 in which the deformation of the big end is exaggeratedly shown. When the big end 1 is deformed as shown in FIG. 6, two hemi-circular bearing halves 3 and 4 of a plain bearing 2 for a crank pin are also deformed, whereby the butted ends of the bearing halves 3 and 4 are constricted so as to protrude radially inwardly. This is so called "a closed in state". When the "closed in state" occurs, edges "A" of crush relief sections 3a and 4a, which are provided to the bearing halves 3 and 4 adjacent at the circumferential ends, respectively, butt locally against a crank pin 5, so that a seizure occurs and/or the bearing halves 3 and 4 move relatively to the big end 1 with a slight amplitude bringing about a fretting phenomenon therebetween or occasionally a fracture of the connecting rod.

Further, when the big end 1 is deformed as described above, clearances between the crank pin 5 and the plain bearing 2 (i.e. the bearing halves 3 and 4) becomes larger longitudinally with respect to the connecting rod. Therefore, the crank pin, which evolves with a high speed, moves relatively and heavily to and within the plain bearing 2 in the longitudinal direction (i.e. upwardly and downwardly in FIG. 6) bringing about cavitation to corrode the bearing surface.

The present invention has been proposed under such technical backgrounds.

BRIEF SUMMARY OF THE INVENTION

An object of the invention is to provide a plain bearing for connecting rods, which can reinforce the connecting rods to improve rigidity thereof.

Under the object, according to a first aspect of the invention, there is provided a plain bearing for connecting rods, which is mounted in an end of a connecting rod and which comprises a cylindrical bearing body and a flange which is provided on an axial end of the bearing body so as to extend along at least a quarter of the circumference of the axial end and projects radially outwardly.

According to this feature, when the plain bearing is mounted on a connecting rod, the latter is reinforced to have improved rigidity as a whole including the plain bearing, whereby, even if the connecting rod is made of a light metal alloy, it is hardly deformed and can effectively prevent seizure of the plain bearing, and occurrence of fretting and cavitation phenomena.

According to a second feature of the invention, the flange is provided on the respective axial ends, so as to extend along the overall circumference of the respective axial ends. According to this feature, the plain bearing can have still higher rigidity as compared with a case of a flange provided only on any one of the axial ends or provided so as to extend along a half of the circumference of the axial end(s).

According to a third feature of the invention, the bearing body comprises a back metal and a bearing alloy layer formed on the back metal, wherein the flange is integrally formed with the back metal by bending the corresponding axial end radially outwardly. According to this feature, the flange is comparatively easily provided to the plain bearing thereby saving the production cost.

According to a fourth feature of the invention, the flange is provided on the axial end by integrally securing a separate flange member to the bearing body. According to this feature, the thickness and/or width of the flange can be optionally determined irrelevantly to the bearing body thereby enhancing still higher the rigidity of the plain bearing as a whole.

DESCRIPTION OF THE PREFERRED EMBODIMENTS

Figure 1:
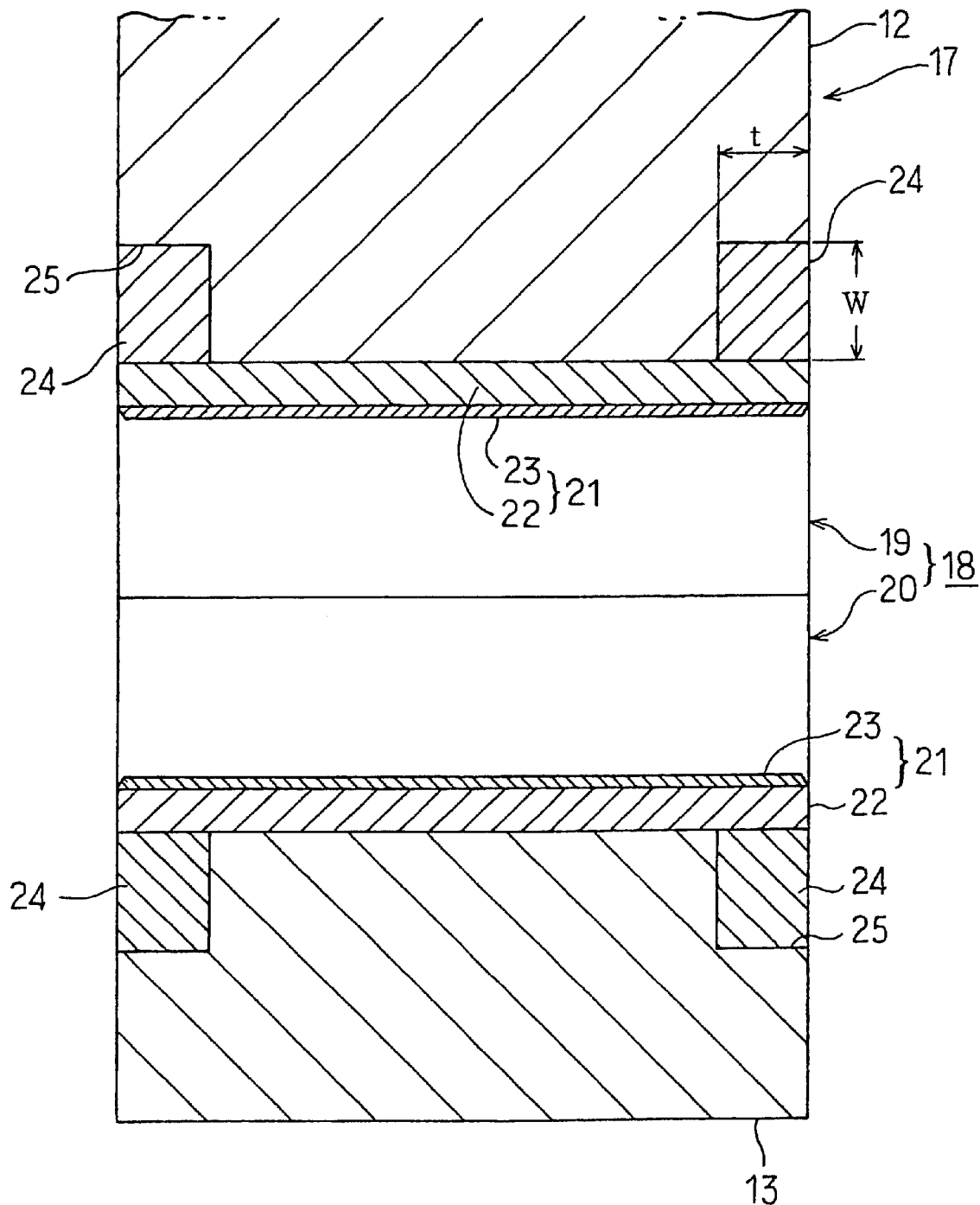
FIG. 1 is an axial sectional view of a plain bearing as one embodiment of the invention.
Figure 2:
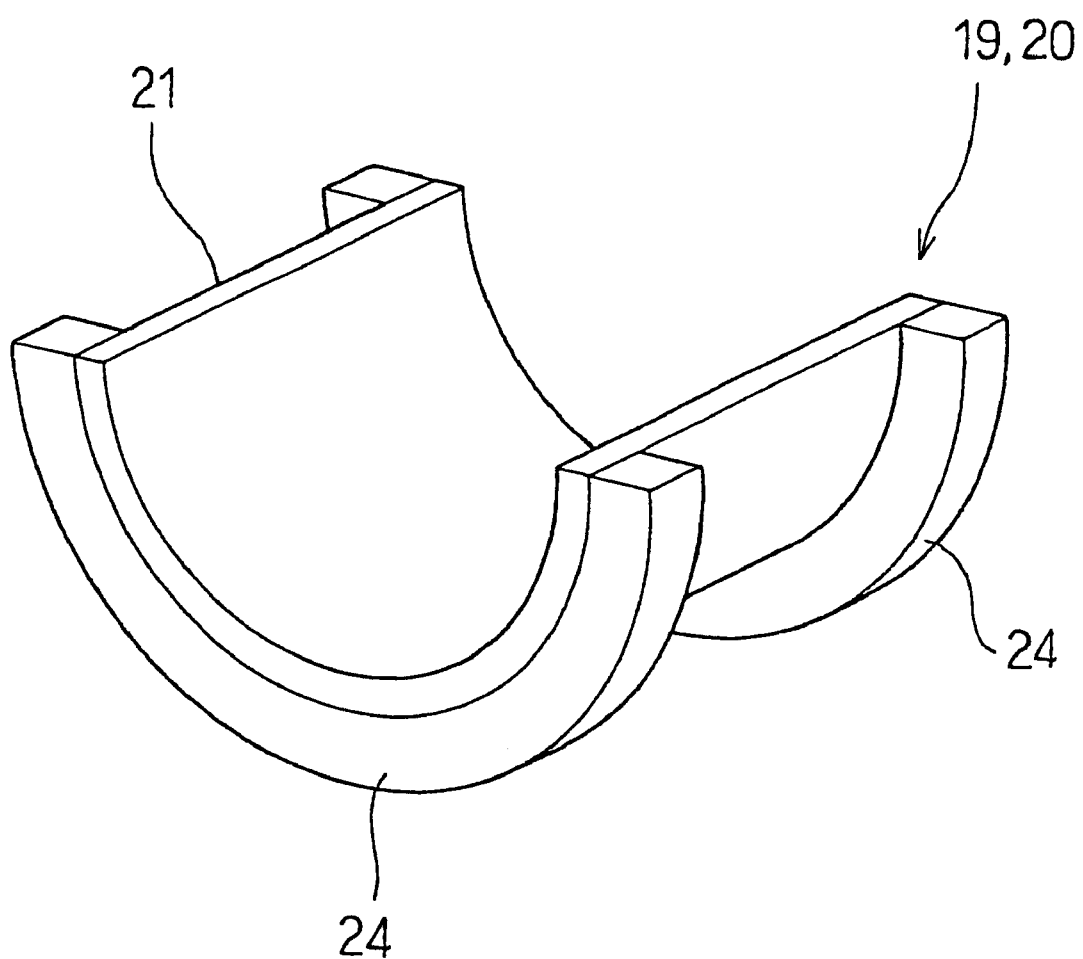
FIG. 2 is a perspective view of a hemi-circular bearing half according to the invention.
Figure 3:
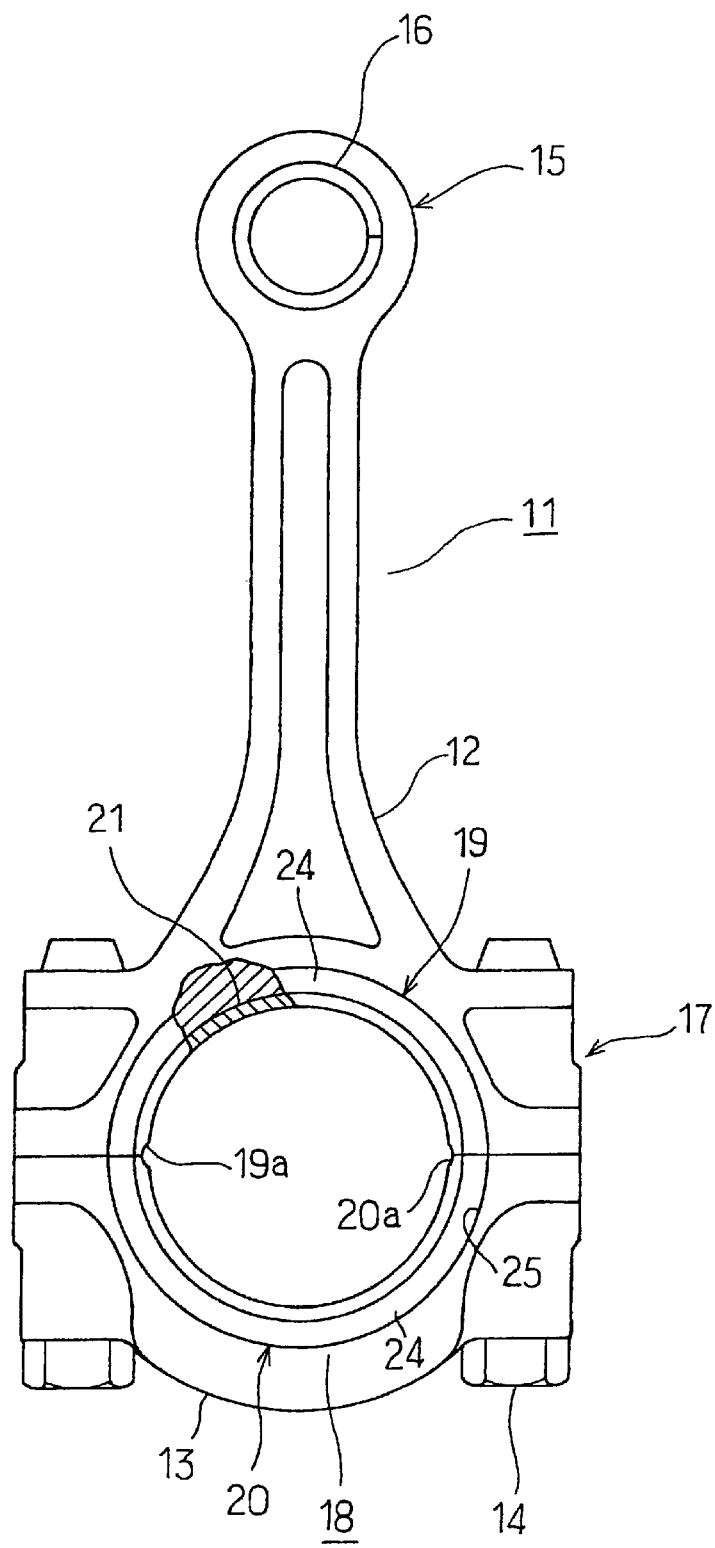
FIG. 3 is a front elevational view of a connecting rod with the plain bearing as shown in FIG. 1.

Referring to FIGS. 1 to 3, a description will be provided of one embodiment of a plain bearing according to the present invention, which bears a crank pin.

As shown in FIG. 3, a connecting rod 11 is so constructed that a cap 13 is attached to one end of a rod body 12 by fastening bolts 14. The rod body 12 of the connecting rod 11 and the cap 13 are made of a light alloy including a titanium alloy, an aluminum alloy and so on. A plain bearing 16 is mounted in the small end 15 as a bearing housing which is one end of the rod body 12. A plain bearing 18 is mounted in the big end 17 of the connecting rod 11 as a bearing housing which is constructed by the other end of the rod body 12 and the cap 13.

The plain bearing 16 at the small end 15 is of a wrapped bush and bears a piston pin (not shown) which is mounted on a piston. The plain bearing 18 at the big end 17 consists of a pair of butted hemi-circular bearing halves 19, 20 and bears a crank pin (not shown) of a crank shaft. Each of the hemi-circular bearing halves 19 and 20 comprises a hemi-circular cylindrical bearing body 21 as a primary part as shown in FIG. 2. The bearing body 21 consists of, as shown in FIG. 1, a back metal 22 and a bearing alloy layer 23 which consists of a copper or aluminum bearing alloy provided on the inner surface of the back metal 22. A cylindrical primary part of the plain bearing 18 consists of a pair of bearing body 21 of the hemi-circular bearing halves 19 and 20. It should be noted also that there are provided crush relieves 19a and 20a on the inner surface of the bearing halves 19 and 20 adjacent to the butted ends thereof so as to form an arch concave at the respective butted ends as shown in FIG. 3.

The respective bearing bodies 21 of the hemi-circular bearing halves 19 and 20 is provided with flanges 24 as shown in FIG. 2. The respective flanges 24 is formed separately from the back metal 22 so as to have a hemi-circular shape and integrally fixed by welding to the outer surface at one axial end of the back metal 22. It should be noted that the back metal 22 is formed from a metal plate with high rigidity (e.g. a steel plate) in order to make the bearing halves 19 and 20 rigid. The flanges 24 are also formed from a steel plate and has a greater thickness than the back metal 22, respectively.

Thus, the plain bearing 18, consisting of a pair of the hemi-circular bearing halves 19 and 20, is provided with the flanges 24 on the overall circumferential outer surface at the both axial ends so as to form a circular ring, respectively. On the other hand, the big end 17 of the connecting rod 11, in which the plain bearing 18 is mounted, is provided with circumferential circular recesses 25 along the outer surface at the both axial ends. The flanges 24 are fitted in the circular recesses 25, respectively.

In this embodiment, the hemi-circular bearing halves 19 and 20 (i.e. the plain bearing 18) have improved rigidity because of the provided flanges 24. Thus, even if the connecting rod 11 has not so high rigidity because of a light alloy, the big end 17 thereof can have improved rigidity by fitting the rigid bearing halves 19 and 20 in the big end 17. Accordingly, even in the case of an engine of high load and high speed, it is possible to restrain deformation of the big end 17 smaller and to effectively prevent occurrence of edge contact at crush relieves 19a and 20a, a fretting phenomenon and/or cavitation.

Also in this embodiment, since the flanges 24 are provided at the both axial ends of the plain bearing 18, it is possible to more effectively achieve high rigidity of the plain bearing 18 in comparison with those having no flange or half circumferential length flanges. Further, since the flanges 24 are formed separately from the back metal 22 and fixed by welding to the back metal 22, it is possible to increase the thickness (t) and the width (w) of the flanges 24 as desired regardlessly to the back metal 22, so that the plain bearing 18 can have further increased rigidity.

Figure 4:
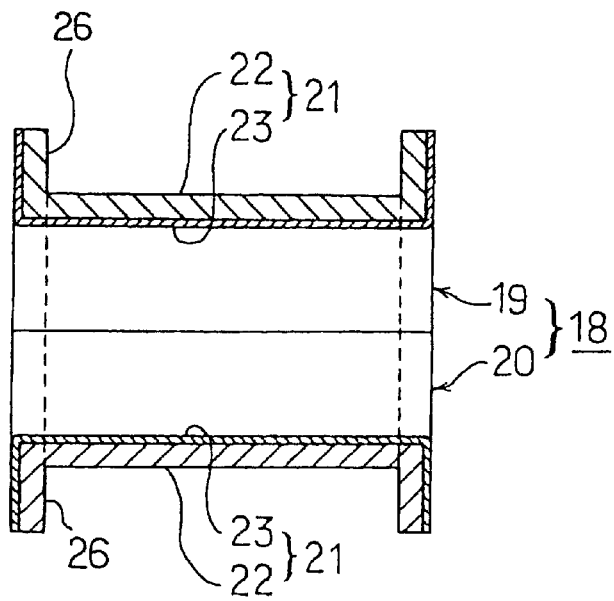
FIG. 4 is an axial sectional view of a plain bearing as another embodiment of the invention.

FIG. 4 shows another embodiment plain bearing 18 of the invention, which is distinguished from the above embodiment in the point that flanges 26 are formed by outwardly bending the both axial end portions of a back metal 22 of the plain bearing 18. In such a case where the flanges 26 are formed by bending the back metal 22 with a bearing alloy layer 23, a planar blank bimetal plate is cut to obtain a rectangular plate with a predetermined size, subsequently both opposed end portions of the rectangular plate are bent to form the flanges by bending and the rectangular plate provided with the flanges is bent overall to a hemi-circular form. Thus, it is possible to omit a tough welding work in comparison with the first embodiment described above, so that the productivity is improved. It is noted that the bearing alloy layer 23 in the flanges 26 can be optionally removed.

It should be also noted that the present invention is not limited to the embodiments described above and rather extended or modified to various alternatives as follows.

Figure 5:
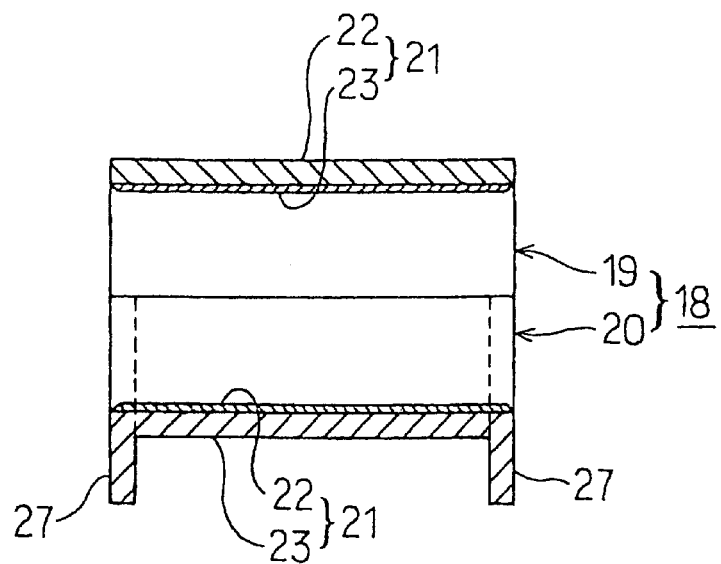
FIG. 5 is an axial sectional view of a plain bearing as still another embodiment of the invention.
Figure 6:
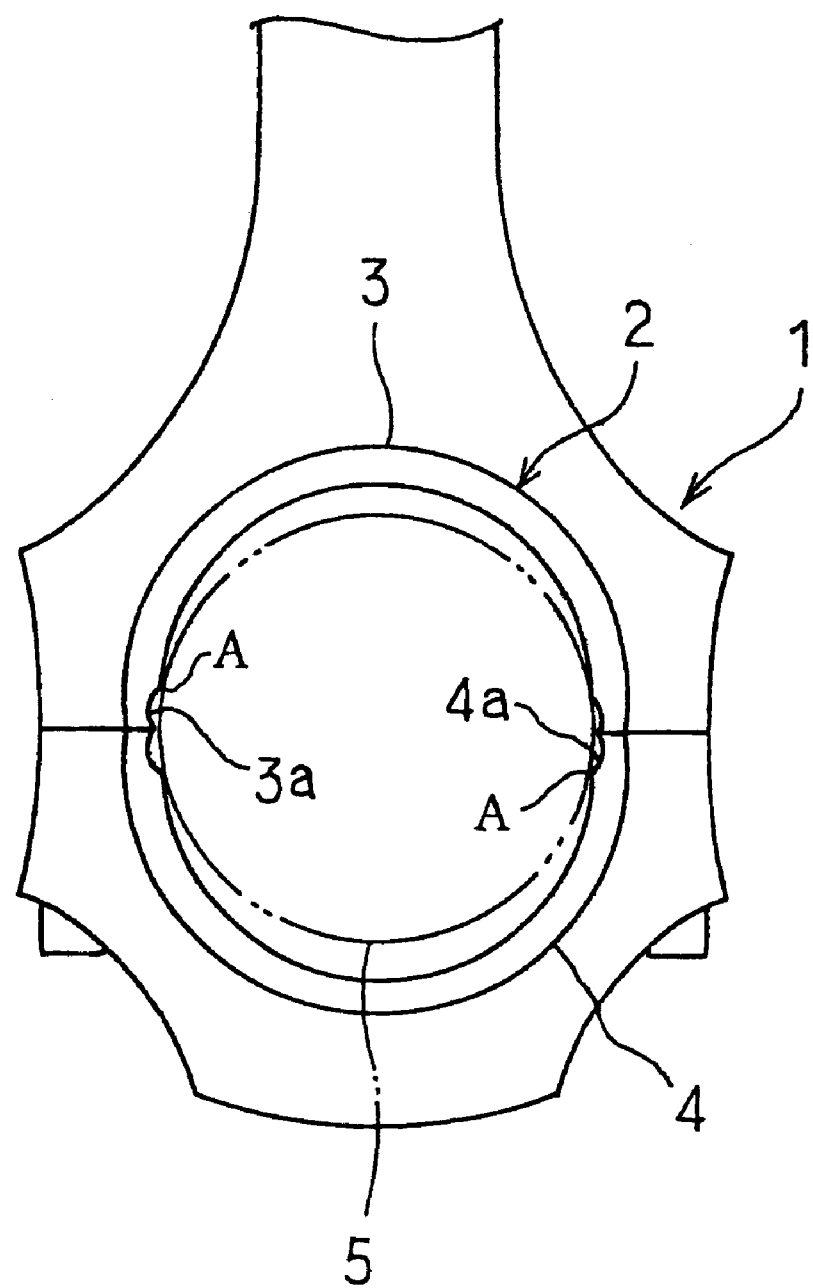
FIG. 6 is a front elevational view of a conventional connecting rod in a deformed state for illustrating a disadvantage of the prior art.

(a) It is not always necessary to provide the flanges 24 and/or 26 in the both hemi-circular bearing halves 19 and 20. It is possible, for example, that an alternative embodiment as shown in FIG. 5 have flanges 27 in only one of hemi-circular bearing halves (the hemi-circular bearing half 20 in FIG. 5).

(b) The flanges 24, 26 and 27 may be provided at only one axial end portion of the hemi-circular bearing halves 19 and 20 in place of those provided at the both end portions thereof. Possibly, the flanges 24, 26 and 27 may be provided along at least one quarter circumferential length at one or both end portions of the bearing halves 19 and 20. In short, it can be determined, taking required strength of a plain bearing into consideration, how to provide the plain bearing with the flange.

(c) The plain bearing 18 is not always made of a pair of hemi-circular bearing halves 19 and 20 but also may be one piece member of an integrally formed cylinder.

(d) It is not always necessary to provide the big end 17 of the connecting rod 11 with the circular recesses 25 into which the flanges 24, 26 and 27 are fitted.

(e) The present invention can be applied to the plain bearing 18 mounted in the small end 15 of the connecting rod 11.

What is claimed is:

1. A plain bearing for connecting rods, which is mounted on an end of a connecting rod, wherein:
    the plain bearing comprises a cylindrical bearing body and a flange which is provided on an axial end of the bearing body so as to extend along at least a quarter of the circumference of the axial end and project radially outwardly;
    wherein the flange is provided on the corresponding axial end by integrally securing a separate flange member to the bearing body;
    said cylindrical bearing body comprising a back metal and bearing layer, said back metal having a first thickness, and wherein said flange has a thickness greater than said first thickness.

2. The plain bearing of claim 1 further comprising a second flange provided on a second axial end of the bearing body so as to extend along at least a quarter of the circumference of the second axial end and project radially outwardly, wherein said second flange comprises a separate flange member integrally secured to the bearing body.

3. A plain bearing for connecting rods, which is mounted on an end of a connecting rod, wherein:
    the plain bearing comprises a cylindrical bearing body and flanges provided on respective axial ends of the bearing body so as to extend along the overall circumference of the axial ends and project radially outwardly;
    wherein said flanges are provided on the corresponding axial ends by integrally securing separate flange members to the bearing body;
    said cylindrical bearing body comprising a back metal and bearing layer, said back metal having a first thickness, and wherein said flanges have a thickness greater than said first thickness.

* * * * *